350-3.85 SR

XR 3,624,605 E

United States

[11] 3,624,605

[72] Inventor Roger L. Aagard
Minneapolis, Minn.
[21] Appl. No. 783,546
[22] Filed Dec. 13, 1968
[45] Patented Nov. 30, 1971
[73] Assignee Honeywell Inc.
Minneapolis, Minn.

[54] OPTICAL CHARACTER RECOGNITION SYSTEM AND METHOD
14 Claims, 7 Drawing Figs.

[52] U.S. Cl. ..... 340/146.3 P, 250/199, 250/219 CR, 350/DIG. 1, 350/3.5, 350/162 SF, 356/71
[51] Int. Cl. ..... G06k 9/08
[50] Field of Search ..... 340/146.3, 149; 350/3.5, 162, 163; 356/71, 162, 168; 250/219, 199

[56] References Cited

UNITED STATES PATENTS

| | | | |
|---|---|---|---|
| 3,527,532 | 9/1970 | Macken | 250/199 |
| 3,363,104 | 1/1968 | Waite et al. | 340/146.3 UX |
| 3,444,316 | 5/1969 | Gerritsen | 350/3.5 X |
| 3,501,238 | 3/1970 | Stetson et al. | 356/71 |
| 3,506,327 | 4/1970 | Leith et al. | 350/3.5 |

OTHER REFERENCES

Chang, et al., IBM Technical Disclosure Bulletin, " Optical Phase Detection," Vol. 9, No. 1, June, 1966. Page 45.
Electronics, " Optical Circuit Controls Laser Beam," Dec. 6, 1963. p. 80

*Primary Examiner*—Maynard R. Wilbur
*Assistant Examiner*—Leo H. Boudreau
*Attorneys*—Lamont B. Koontz and Omund R. Dahle

ABSTRACT: A system and method for identifying an unknown character by superimposing two coherent light beams containing diffraction patterns of an unknown and a reference character. The two light beams have either different phase or frequency so that the diffraction patterns generate a beat frequency in areas where they overlap. When the reference and unknown characters are identical, there is total overlap of the two diffraction patterns and the beat frequency intensity of the overlapped patterns is a maximum. When the reference and unknown characters are dissimilar, the intensity of the beat frequency is less than a maximum; the actual value depending upon the degree of similarity. a detector tuned to beat frequency provides an output indicative of the correlation between the unknown and reference characters.

3624605

INVENTOR.
ROGER L. AAGARD

BY [signature]

ATTORNEY.

INVENTOR.
ROGER L. AAGARD
BY [signature]
ATTORNEY.

OPTICAL CHARACTER RECOGNITION SYSTEM AND METHOD

BACKGROUND OF THE INVENTION

The present invention relates to a system and method for providing opto-electronic recognition of geometric characters.

Character recognition utilizing coherent light is generally achieved by a spatial filtering technique. This technique has been used in conjunction with optical Fraunhofer diffraction patterns to eliminate the problem of misregistration of the reference character. Using this technique a Fraunhofer diffraction pattern of an unknown character is generated and compared with a plurality of reference diffraction patterns contained in a complex mask. See for example, U.S. Pat. No. 3,064,519 entitled "Specimen Identification Apparatus and Method" issued to Glenmore L. Shelton, Jr. A disadvantage with the optical spatial filtering technique is that the optical system required to provide character recognition is necessarily complex.

SUMMARY OF THE INVENTION

By means of an optical heterodyne technique, the present invention eliminates the need for a complex reference mask thereby reducing the complexity of the optical system. In the present invention, at least first and second substantially coherent light beams having a different frequency or time varying phase are provided. A first light beam is directed past an unknown character to form a spatial pattern of that character. A second light beam is simultaneously directed past a reference character to form a spatial pattern of that character. The first and second light beams containing the spatial patterns are then at least partially superimposed. The intensity of the superimposed light beams in the area where the spatial patterns overlap has a beat frequency. This beat frequency intensity is dependent on the degree of similarity between the unknown and reference characters. Detector means receive the superimposed light beams and provide an output proportional to the beat frequency intensity.

By superimposing first and second light beams containing spatial patterns of an unknown and reference character respectively and measuring the beat frequency intensity produced where the spatial patterns overlap, the need for a complex reference mask is eliminated. Furthermore, one embodiment of the present invention provides an additional advantage in that utilization of a holography technique results in greater storage capacity in the reference transparency. In another embodiment of the present invention, an unknown character is simultaneously compared with a plurality of reference characters to provide high speed character recognition.

DESCRIPTION OF THE PREFERRED EMBODIMENTS

Figures 1, 2, 3:
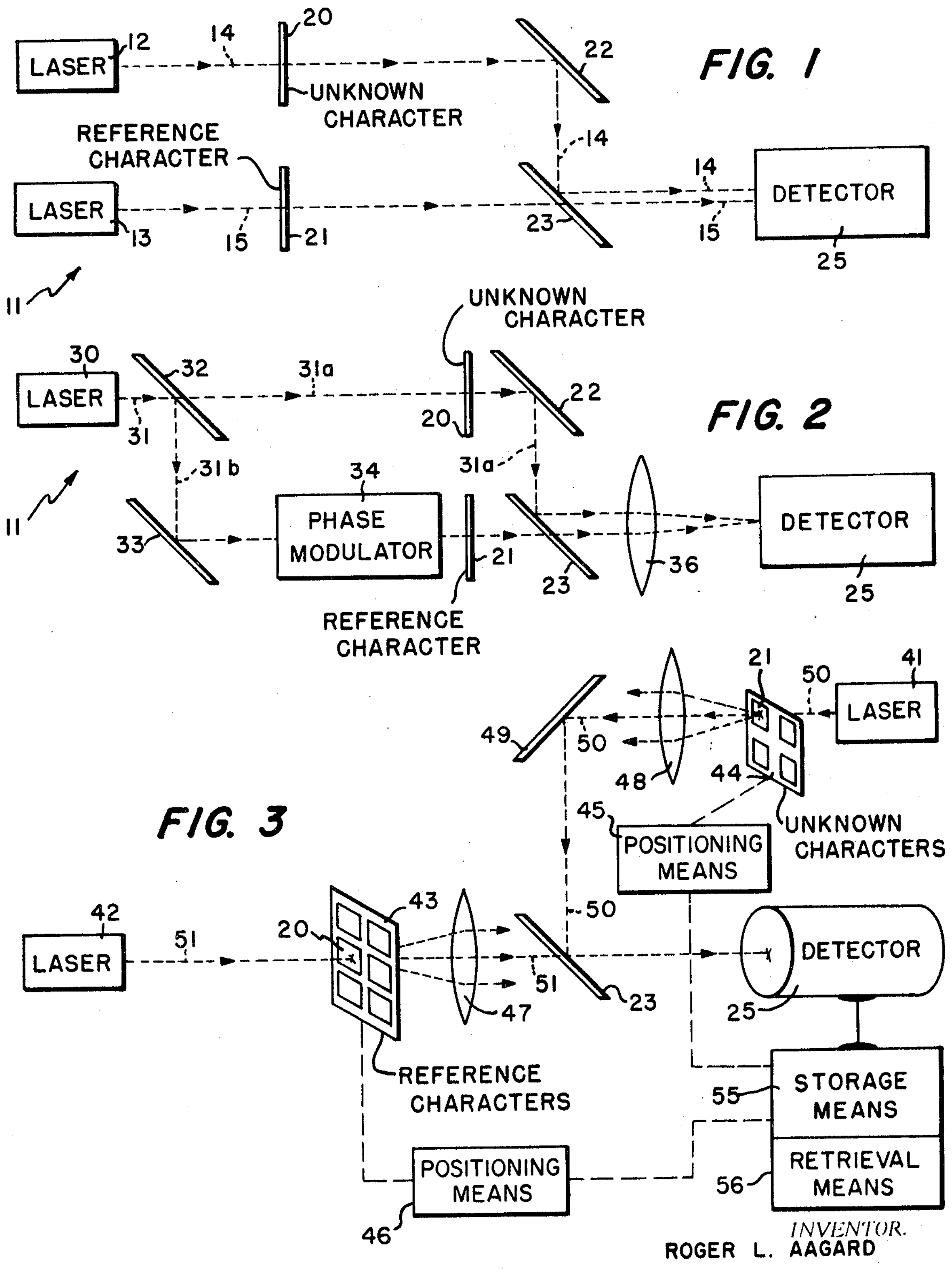
FIG. 1 is a diagrammatical illustration of a character recognition system according to the invention utilizing two separate light sources.
FIG. 2 is a diagrammatical illustration of a character recognition system according to the invention utilizing one light source.
FIG. 3 is a diagrammatical illustration of a preferred embodiment of a character recognition system according to the invention wherein an unknown character is identified by comparison with reference characters contained in a single reference transparency.

The present invention relates in one form to a system for identifying unknown characters and in another form to a method for achieving this end. The system is not limited to the recognition of only numerical or alphabetical characters. Instead, character recognition as used herein is to be considered synonymous with the recognition of any geometrical pattern, design, specimen or the like. Furthermore, the use of the word "character," without limitation, is intended to be either singular or plural. However, for simplicity of illustration, the unknown and reference characters in FIGS. 1 and 2 are singular. These characters are normally either an opaque region on a transparency or a transparent region with an opaque background. It is common in the art to refer to these types of unknown and reference characters as transparencies. In the embodiments shown, the unknown and reference characters are transparent regions having an opaque background.

In FIGS. 1–5, the same reference numerals are used to designate corresponding elements. In FIG. 1, the light source means generally designated 11 comprises two substantially coherent light sources illustrated as lasers 12 and 13. Lasers 12 and 33 generate first and second substantially coherent light beams designated 14 and 15 respectively. The lasers are chosen so as to give light beams 14 and 15 properties which cause the two beams to generate a beat frequency when superimposed. That is, light beam 14 can be either of a first frequency while light beam 15 is of a second frequency or one of the light beams can have a time varying phase relative to the other beam. In the embodiment illustrated in FIG. 1, the frequencies of light beams 14 and 15 differ.

As illustrated, an unknown character 20 intercepts the path of light beam 14 ad a reference character 21 intercepts the path of light beam 15 to provide means for forming spatial patterns of the unknown and reference characters respectively. Mirror 22 and half silvered mirror 23 provide means for at least partially superimposing beams 14 and 15. The superimposed beams are then incident upon detector means 25 which may include a photomultiplier, the operation of which is well known in the art.

Figures 4, 5, 6, 6A:
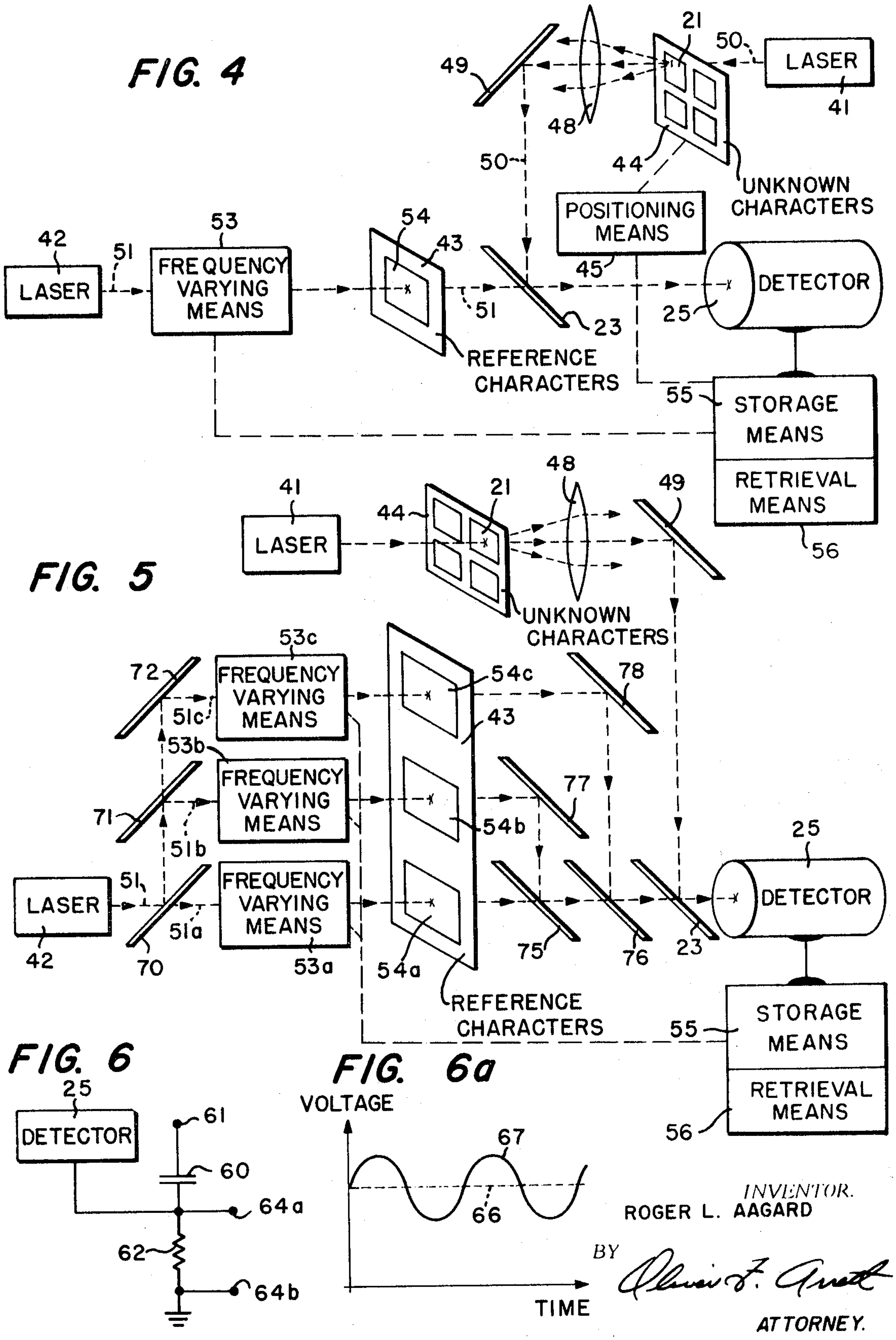
FIG. 4 is a diagrammatical illustration of a preferred embodiment of a character recognition system according to the invention wherein a plurality of reference characters are stored in a hologram.
FIG. 5 is a diagrammatical illustration of a preferred embodiment of a character recognition system according to the invention wherein an unknown character is simultaneously compared to a plurality of reference characters.
FIG. 6 is a schematic illustration of an electrical circuit for measuring both the AC and DC output from the light detector used in the invention.
FIG. 6*a* is a graphical illustration of the voltage output from the light detector shown in FIG. 4.

Herein, the term spatial pattern is used to denote either a diffraction pattern or an image pattern. In the embodiment illustrated in FIG. 1, an optical lens has not been provided to focus light beams 14 and 15 after they are diffracted by the unknown and reference characters respectively. Thus, the spatial pattern incident upon detector 25 is a Fresnel diffraction pattern. Furthermore, although converging lenses are provided in FIGS. 2 and 3, detector 25 is illustrated as being positioned in the focal plane of these lenses such that a diffraction pattern is again incident upon the detector. However, character recognition can be achieved by the present invention equally as well when the detector is in the image plane of the converging lens as illustrated in FIGS. 4 and 5.

In operation, the path of light beam 14 is intercepted by unknown character 20. Unknown character 20 diffracts light beam 14, whereby a Fresnel diffraction pattern of the unknown character is formed. Simultaneously, laser 13 generates light beam 15. The path of light beam 15 is intercepted by reference character 21. The reference character diffracts light beam 15, forming a Fresnel diffraction pattern of that character.

Light beam 15 containing the diffraction pattern of the reference character is transmitted through half-silvered mirror 23 and is incident upon detector 25. After reflection and redirection of light beam 14 by mirror 22, half-silvered mirror 23 directs beam 14 in a direction substantially parallel to the direction of beam 15 and in such a manner as to cause superposition of light beams 14 and 15. When incident upon detector 25, the diffraction patterns contained in the superimposed light beams overlap an amount dependent on the degree of similarity between the unknown and reference characters.

The intensity of the superimposed beams at detector 25 is given by the equation:

$I = A_1^2 + A_2^2 + 2A_1A_2 \cos \Delta wt.$

Where:

$A_1$=amplitude of light beam 14;

$A_2$=amplitude of light beam 15;

Δw=the beat frequency, i.e., the difference in frequency between light beams 14 and 15, and $t$=time In the area where the diffraction patterns overlap, the intensity, is given by the term $2A_1A_2\cos\Delta wt$. This intensity has a beat frequency equal to the difference in frequency between light beams 14 and 15. In this embodiment, detector means 25 includes a tuned inductance-capacitance circuit, well known in the art, to measure the beat frequency intensity. The output from detector 25 has this same beat frequency. By integrating the beat frequency intensity over its entire detecting area, detector 25 provides an output indicative of the size of the area in which the Fresnel diffraction patterns overlap. The greater the degree of similarity between the unknown and reference characters, the greater the degree of similarity between the spatial patterns of the unknown and reference characters. As the similarity between the spatial patterns increase, so does the area in which the diffraction patterns overlap and hence the larger the output from detector 25. Thus, an output of maximum beat frequency amplitude indicates maximum correlation, i.e., that the reference and unknown characters are essentially identical.

The character recognition system illustrated in FIG. 2 is similar to that shown in FIG. 1. However light source means 11 which included two coherent light sources 12 and 13 in FIG. 1 is replaced by a single coherent light source, light separating means 32 and phase modulator means 34. The single coherent light source is shown as laser 30. The light separating means, shown as half silvered mirror 32, separates light beam 31 into first and second beams 31*a* and 31*b* respectively. Also included in this embodiment is means for redirecting light beam 31*b* toward modulator 34, shown as mirror 33. In this embodiment, phase modulator means 34 is an electro-optical (E–O) crystal having an electric field dependent index of refraction. Additionally included in this system are means for superimposing light beams 31*a* and 31*b* illustrated as mirror 22 and half-silvered mirror 23. Means for forming Fourier transforms of the unknown and reference characters is illustrated as converging lens 36. The converging lens transforms the Fresnel diffraction patterns formed by the diffraction of light beams 31*a* and 31*b* by unknown character 20 and reference character 21 respectively into Fraunhofer diffraction patterns. As is well known in the art, a Fraunhofer diffraction pattern is the optical realization of a Fourier transform. With the insertion of lens 36 into the system, the distance of detector 25 from the object plane, that is, the plane in which unknown character 20 and reference character 21 are positioned, determines whether the spatial pattern formed at the detector is a Fraunhofer diffraction pattern or an image pattern. As is well known, the image plane is a greater distance from the object plane than the diffraction pattern plane (focal plane). As stated previously, in this embodiment detector 25 is positioned in the diffraction pattern plane.

In operation, light beam 31, generated by laser 30, is split into first beam 31*a* and second beam 31*b* by half silvered mirror 32. Unknown character 20 intercepts the path of beam 31*a* and diffracts the beam to form a Fresnel diffraction pattern of that character. Beam 31*a* containing the Fresnel diffraction pattern is then directed by mirror 22 toward half silvered mirror 23. Mirror 23 redirects beam 31*a* through lens 36 to detector 25.

Simultaneously, light beam 31*b* is directed by half silvered mirror 32 toward mirror 33 and then redirected by mirror 33 through phase modulator 34. By applying a variable electric field to E–O modulator 34, the phase of light beam 31*b* is time-varied with respect to the phase of light beam 31*a*. After phase modulation, reference characters 21 intercepts the path of beam 31*b* and diffracts the beam to form a Fresnel diffraction pattern of the reference character.

Half silvered mirror 23 superimposes beams 31*a* and 31*b* containing the Fresnel diffraction patterns and transmits the beams through lens 36 which forms Fourier transforms of the unknown and reference characters on detector 25. In this embodiment, the modulation frequency of modulator 34 determines the beat frequency produced where the Fourier transforms formed by lens 36 overlap on detector 25. Detector 25, tuned to this beat frequency, provides an electrical proportional to the intensity of the beat frequency which is, as explained previously, indicative of the degree of similarity between the unknown and reference characters.

Lens 36 is not necessary to make the present invention operational. However, the generation of Fourier transforms of the unknown and reference characters does provide some enhancement of the operation of the character recognition system. That is, since the Fourier transforms are insensitive to the position of the unknown and reference characters, the recognition system is more adaptable to various recognition problems. However, when lens 36 is used, the two wave fronts containing the diffraction patterns of the unknown and reference characters are not coplanar when incident upon detector 25 unless the unknown and reference characters are in an equivalent position with respect to the transform lens. When the wave fronts are not coplanar, they interfere with one another to produce dark fringes in areas which would normally be light. Since the detector provides an output proportional to the integral of the intensity over the entire detector surface area, the dark fringes reduce the maximum output of the detector which in turn reduces the discrimination capabilities of the character recognition system. Thus, the positioning of the unknown end reference characters should be substantially stationary. This reduces the value of forming Fourier transforms.

The character recognition system illustrated in FIG. 3 is adapted to provide character recognition of a plurality of unknown characters contained in transparency 44 by individually comparing the characters to a plurality of reference characters appearing in reference transparency 43. In this embodiment light source means 11 comprises two lasers 41 and 42 having different frequencies, but it is apparent that the system may be made operational utilizing only one laser and a phase modulation scheme such as described in conjunction with FIG. 2.

In the embodiment illustrated in FIG. 3, laser 41 generates light beam 50 which is intercepted by one of the unknown characters positioned in the path of beam 50, such as character 21, on transparency 44. Optical lens 48 converges light beam 50 containing the Fresnel diffraction pattern of character 21 to form a Fourier transform of that character. Mirror 49 then directs light beam 50 toward the half-silvered mirror 23 which in turn directs beam 50 onto detector 25. Unknown character transparency 44 is, in this embodiment, mounted on a movable carriage shown as positioning means 45 which systematically positions a selected unknown character in the path of light beam 50. The movable carriage provides means for sequentially forming spatial patterns of the unknown characters. That is, the carriage is movable in either of the two directions which are perpendicular to the direction of light beam 50 to thereby provide systematic scanning of beam 50 over all of the characters in the transparency. There are, of course, other methods of selectively positioning an unknown character in the path of light beam 50. For example, the unknown characters could be contained in a rotatable disc.

As illustrated, light beam 51 generated by laser 42 is intercepted by one of the characters, such as 20, on reference transparency 43 by positioning the transparency such that the desired character is in the path of the beam. The positioning of the transparency is again provided by a movable carriage shown as positioning means 46. Reference character 20 diffracts beam 51 to form a Fresnel diffraction patten of that character. The Fresnel diffraction pattern is then transformed into a Fourier transform by converging lens 47. Half silvered mirror 23 superimposes light beam 50 and 51, causing the Fourier transforms of the unknown and reference characters to overlap when incident upon detector 25. The intensity of the area in which the Fourier transforms overlap has a beat frequency which in this embodiment is equal to the difference in frequencies between light beams 50 and 51. As stated previously, the overlap of the Fourier transforms is a maximum when the unknown and reference characters are identical. Since the detector integrates the beat frequency light intensity over its entire surface area, the situation of identical characters (maximum similarity) results in an output of maximum beat frequency amplitude. The detector which is tuned to the beat frequency generated by the overlapped Fourier transforms, thus provides an output indicative of the degree of similarity between the unknown and reference characters. To determine which reference character is identical to unknown character 21, light beam 51 is systematically directed past each reference character in transparency 43 to sequentially form a diffraction pattern of each reference character for comparison purposes. Light beam 51 is then directed onto detector 25 where the Fourier transform of the unknown character, the amount of overlap being dependent upon the degree of similarity between the unknown and reference characters. In the embodiment illustrated in FIG. 3, each output obtained from detector 25 is stored in storage means 55 in a manner such that each particular output can later be identified with the reference and unknown characters which were being scanned when that output was obtained. Such storage is readily provided by a computer. After storing outputs generated by the systematic superimposition of the light beams containing Fourier transforms of the unknown character and each of the reference characters, the maximum output is retrieved from storage by retrieval means 56. The unknown character is then identified with the reference character whose diffraction pattern overlapped onto the diffraction pattern of the unknown character to provide the maximum output.

In another embodiment the reference transparency 43 shown in FIG. 3 may be a hologram containing a plurality of reference characters. In storing the characters in the hologram, the hologram is rotated to vary the angle of the incident light beam with respect to the hologram as each reference character is stored. This allows a plurality of reference characters to be stored superimposed on one another, thereby increasing the storage density. This method of character storage is described in an article entitled "Multiple Recording of Holograms" by Mrs. M. Marchant and D. Knight appearing in *Optics Acta*, Volume 14, page 199 (1967). In this case, a reference character is read out of the hologram by having the light beam incident transparency 43 at the same angle that this particular reference character was stored in the hologram. This is achieved by rotation of transparency 43 to position it at the desired angle with respect to beam 51. A real image of the selected reference character, rather than a diffraction pattern, is incident on detector 25. Thus, detector 25 must be positioned in the image plane of lens 48 such that detector 25 provides an output indicative of the beat frequency generated by the overlap of the image patterns of the reference and unknown characters. In this embodiment as well as in the embodiments described in conjunction with FIGS. 4 and 5, the unknown characters can be stored in a transparency in a manner similar to the storage of reference characters in the reference transparencies. Spatial patterns of the unknown characters are then formed in a manner similar to that described for forming spatial patterns of the reference characters.

In FIG. 4 is illustrated another embodiment of a character recognition system according to the present invention. In this embodiment, light source means 11 includes lasers 41 and 42 and frequency varying means 53 which selectively varies the frequency of light beam 51. Frequency varying means 53 may be a lithium niobate ($LiNbO_3$) crystal which will vary the frequency of a traversing light beam as a function of temperature. This variation in frequency is described in an article entitled "Tuneable Coherent Parametric Oscillation in $LiNbO_3$ at Optical Frequencies" by J. A. Giordmaine and R. C. Miller in *Physical Review Letters*, Volume 14, page 973 (1965). In the embodiment of FIG. 4, a plurality of reference characters are again stored in a hologram on he same area, shown as area 54, of transparency 43. Now, however, rather than storing the characters at different angles, the characters can each be stored at a different frequency such that each character is systematically read out by directing a light beam past it having the same frequency as that used to store this character in the hologram. Frequency varying means 53 is utilized to vary the frequency of light beam 51 to the desired frequency for this purpose. The characters do not have to be stored in a hologram, but instead the reference character transparency can take the form described in conjunction with FIG. 3. As in FIG. 3, light beam 51 containing the image pattern of a reference character is superimposed onto light beam 50 containing an image pattern of an unknown character. In the present embodiment, the beat frequency generated where the image patterns overlap varies depending upon the frequency of light beam 51. Detector means 25 is adapted to provide an output indicative of the intensity of each of the plurality of beat frequencies generated in comparing the unknown character with each reference character. This is provided by a series of inductance-capacitance circuits each tuned to one of the possible beat frequencies.

Shown in FIG. 5 is a modified embodiment of the character recognition system shown in FIG. 4. Included in the embodiment of FIG. 5 are frequency varying means 53*a*, 53*b* and 53*c*; and light directing means comprising half-silvered mirrors 70, 71, 75, 76 and 23 and mirrors 72, 77, 78 and 49. Half-silvered mirrors 70 and 71 and mirror 72 divide beam 51 into component beams 51*a*, 51*b* and 51*c* such that light beams can be simultaneously diffracted by a reference character stored in each of the areas 54*a*, 54*b*, and 54*c* of transparency 43. Here areas 54*a*, 54*b* and 54*c* each contain a plurality of characters stored at different frequencies superimposed on one another. Frequency varying means 53*a*, 53*b* and 53*c* selectively vary the frequency of light beams 51*a*, 51*b* and 51*c* respectively, such that each of the beams has a frequency equal to a frequency at which a reference character was stored in the hologram. Beams 51*a*, 51*b* and 41*c* must always have different frequencies such that three different beat frequencies are generated wherein the image pattern of the unknown character overlaps onto the image patterns of reference characters. The image patterns of the reference characters are produced as described in conjunction with FIG. 4.

In the embodiment of FIG. 5 the image patterns of three reference characters are simultaneously superimposed by mirrors 77, 78 an 49 and half-silvered mirrors 75, 76 and 23 onto the image pattern of an unknown character contained in light beam 50. As shown, the overlap of each image pattern of a reference character onto the image pattern of the unknown character will simultaneously generate three beat frequencies. By using sharply tuned circuits, each beat frequency can be filtered out of this spectrum of beat frequencies. The intensity of each beat frequency is indicative of the degree of similarity between the unknown character and the reference character whose image pattern is being compared to that of the unknown. The outputs can be stored, if desired, as previously described. Furthermore, it is readily apparent that light beam 51 could be separated into a greater or lesser number of components if desired.

As described herein, the present invention achieves character recognition by systematically overlapping the diffraction pattern of an unknown character onto a plurality of reference character diffraction patterns. In comparing certain characters, such as comparing an E with an L and in comparing two L's, the intensity of the beat frequency generated where the diffraction patterns overlap will be similar for both comparisons. The disadvantage in possibly not being able to discriminate between certain characters (e.g., between an E and an L and two L's) can be overcome by measuring the DC intensity of the nonoverlapping regions of the spatial patterns as well as the beat frequency intensity. Since the intensity of the DC region when two L's are being compared is different from the intensity of the DC region when an E and an L are being compared, the unknown character can be positively identified.

FIG. 6 illustrates one electrical circuit by which the intensity of the overlapped diffraction patterns and the DC intensity of the nonoverlapping regions is measured. Detector 25 integrates the intensity of the incident light beams over its entire surface area, providing an output which is the sum of the intensities of the overlapped and nonoverlapped diffraction patterns. The constant voltage output which results from an integration of the intensity from the area in which the diffraction patterns do not overlap is illustrated as dotted line 66 in FIG. 6*a*. The oscillatory voltage output which results from integrating the intensity of the area where the diffraction patterns overlap adds to the DC voltage. The sum of the two voltage is illustrated as line 67. To measure the AC output from the detector, capacitor 60 is inserted in the circuit. Capacitor 60 blocks the DC output and allows measurement of the AC output from detector 25 at terminal 61. The DC output is then measured across resistor 62 at terminals 64*a* and 64*b* using a DC voltmeter.

Although the optical character recognition system and method comprising the present invention has been describe with reference to a series of preferred embodiments, it will be apparent to one of ordinary skill in the art that many modifications can be made without affecting the scope of the present invention, which is particularly defined by the following claims.

The embodiments of the invention in which an exclusive property or right is claimed are defined as follows:

1. A method of identifying an unknown character comprising the steps of:
directing a first light beam along a first path;
directing a second light beam along a second path, ties so related to the properties of the first the second light beam differing from the first light beam such that a beat frequency is generated when the two beams overlap;
positioning an unknown character in the path of the first beam to form a spatial pattern of the unknown character,
positioning a reference characters in the path of the second beam to form a spatial pattern of the reference character,
superimposing the spatial pattern containing light beams to generate a beat frequency signal where the spatial patterns overlap, and
measuring the intensity of the beat frequency signal to obtain an indication of the degree of similarity between the unknown and reference characters.

2. The method of identifying an unknown character as defined in claim 1 wherein the first and second light beams differ in frequency.

3. A character recognition system wherein an unknown character is compared to a reference character, the system comprising:
first light source means for providing a first substantially coherent light beam;
second light source means for providing a second substantially coherent light beam, the second light beam differing from the first light beam such that a beat frequency signal is produced when the first and second light beams are superimposed;
first spatial pattern forming means intercepting the path of the first light beam to form a spatial pattern of an unknown character with the first beam;
second spatial pattern forming means intercepting the path of the second light beam to form a spatial pattern of a reference character with the second beam;
means for superimposing the first and second light beams containing the spatial patterns whereby a beat frequency signal is generated where the spatial patterns overlap, the intensity of the beat frequency signal being dependent on the degree of similarity existing between the unknown and reference characters, and
detector means positioned to receive the superimposed first and second light beams and tuned to the beat frequency to provide an output indicative of the intensity of the beat frequency signal.

4. The character recognition system of claim 3 wherein the detector means further includes means for providing an output indicative of the intensity of the first and second light beams where the spatial patterns do not overlap.

5. The character recognition system of claim 3 wherein the first and second light source means comprise:
a light source for producing a single substantially coherent light beam;
light separating means for separating the single light beam produced by the light source into first and second light beams; and
phase modulator means associated with one of the first and second light beams to time-vary the phase of one beam relative to the other beam.

6. The character recognition system of claim 5 wherein;
the light source is a laser;
the light separating means and the light superimposing means are half-silvered mirrors, and
the phase modulator means is an electro-optic crystal having an electric field dependent index of refraction.

7. The character recognition system of claim 3 wherein the first and second light beams differ in frequency.

8. The character recognition system of claim 7 wherein:
the first and second light source means are lasers, and
the light superimposing means is a half-silvered mirror.

9. The character recognition system of claim 3 wherein:
the second spatial pattern forming means further includes means for systematically positioning each of a plurality of reference characters in the path of the second beam to sequentially form a spatial pattern of each,
storage means are included for storing the intensity of the beat frequency signal corresponding to each of the plurality of reference characters, and
retrieval means are included for selecting the maximum intensity stored, thereby identifying the unknown character with the reference character which produced the maximum intensity beat frequency signal.

10. The character recognition system of claim 9 wherein the first and second light source means comprise:
a light source for producing a single substantially coherent light beam;
light separating means for separating the single light beam produced by the light source into first and second light beams, and
phase modulator means associated with one of the first and second light beams to time-vary the phase of one beam relative to the other.

11. The character recognition system of claim 9 wherein the first and second light beams differ in frequency.

12. The character recognition system of claim 3 wherein the first and second spatial pattern forming means comprise:
means for forming a Fresnel diffraction pattern the unknown and reference character, respectively, and
means for transforming the Fresnel diffraction patterns to Fraunhofer diffraction patterns.

13. The character recognition system of claim 3 wherein:
The second light source means further includes
light separating means for separating the second light beam into a plurality of light beams, and frequency varying means associated with each of the plurality of light beams for providing each light beam with a different frequency such that each beam is capable of producing a different beat frequency signal when superimposed with the first light beam, the second spatial pattern forming means includes means intercepting the path of each of the plurality of light beams to form a spatial pattern of a different reference character with each of the plurality of light beams, the light beam superimposing means further includes means for superimposing each of the plurality of light beams with a first light beam to simultaneously produce a plurality of different beat frequency signals, the detector means is tuned to each of the beat frequencies produced to provide an output indicative of the intensity of each beat frequency signal generated where the spatial patterns overlap, storage means are included for storing the intensity of the beat frequency signal corresponding to each of the plurality of reference characters, and retrieval means are included for selecting the maximum intensity stored, thereby identifying the unknown character with the reference character which produced the maximum intensity beat frequency signal.

14. The character recognition system of claim 3 wherein:

the second spatial pattern forming means comprises a hologram in which a plurality of reference characters are stored, each of the reference characters being stored at a different frequency, the second light source means further includes means for varying the frequency of the second light beam to sequentially produce a spatial pattern of each of the plurality of reference characters, each spatial pattern producing a different beat frequency when superimposed with the first spatial pattern, storage means are included for storing the intensity of the beat frequency signal corresponding to each of the plurality of reference characters, and retrieval means are included for selecting the maximum intensity stored, thereby identifying the unknown character with the reference character which produced the maximum intensity beat frequency signal.

* * * * *